US012049884B2

(12) United States Patent
Baillet et al.

(10) Patent No.: US 12,049,884 B2
(45) Date of Patent: Jul. 30, 2024

(54) METHOD FOR ASSEMBLING A HIGH-PRESSURE PRECOMPRESSION PUMP

(71) Applicant: APTAR FRANCE SAS, Le Neubourg (FR)

(72) Inventors: Matthieu Baillet, Rouen (FR); Ludovic Petit, Vitot (FR)

(73) Assignee: APTAR FRANCE SAS, Le Neubourg (FR)

( * ) Notice: Subject to any disclaimer, the term of this patent is extended or adjusted under 35 U.S.C. 154(b) by 445 days.

(21) Appl. No.: 17/595,256

(22) PCT Filed: May 11, 2020

(86) PCT No.: PCT/FR2020/050765
§ 371 (c)(1),
(2) Date: Nov. 12, 2021

(87) PCT Pub. No.: WO2020/229759
PCT Pub. Date: Nov. 19, 2020

(65) Prior Publication Data
US 2022/0220955 A1 Jul. 14, 2022

(30) Foreign Application Priority Data
May 14, 2019 (FR) ....................................... 1905014

(51) Int. Cl.
*F04B 39/14* (2006.01)
*B05B 11/10* (2023.01)
(Continued)

(52) U.S. Cl.
CPC .......... *F04B 39/14* (2013.01); *B05B 11/1039* (2023.01); *F04B 39/0016* (2013.01); *F04B 53/143* (2013.01)

(58) Field of Classification Search
CPC .... F04B 39/14; F04B 39/0016; F04B 53/143; F04B 13/00; B05B 11/1047; B05B 11/1069; B05B 11/1039
(Continued)

(56) References Cited

U.S. PATENT DOCUMENTS 4,021,153 A * 5/1977 Cloup ..................... F04B 13/00 417/489
4,325,501 A 4/1982 Shay
(Continued)

FOREIGN PATENT DOCUMENTS

EP 0 265 270 A1 4/1988
EP 1 698 399 A1 9/2006
(Continued)

OTHER PUBLICATIONS

International Preliminary Report on Patentability dated Jun. 18, 2021, issued by the International Preliminary Examination Authority in application No. PCT/FR2020/050765.
(Continued)

*Primary Examiner* — Nathan C Zollinger
(74) *Attorney, Agent, or Firm* — Sughrue Mion, PLLC

(57) ABSTRACT

A method for assembling a fluid product dispensing pump, including providing a piston (1) secured to an actuation rod (2); a pump body (3) having a pump chamber (5); a sleeve (50), an outlet valve element (39) an inlet valve element (10) which slides in a sleeve (9) of the pump body having a reduced diameter; and a spring (20). The method includes fixing the outlet valve element in the piston; inserting the piston and the outlet valve element into the sleeve; inserting from the top the spring and the inlet valve element into said sleeve; and inserting from the top the sleeve into the pump body.

6 Claims, 6 Drawing Sheets

Figure 1:
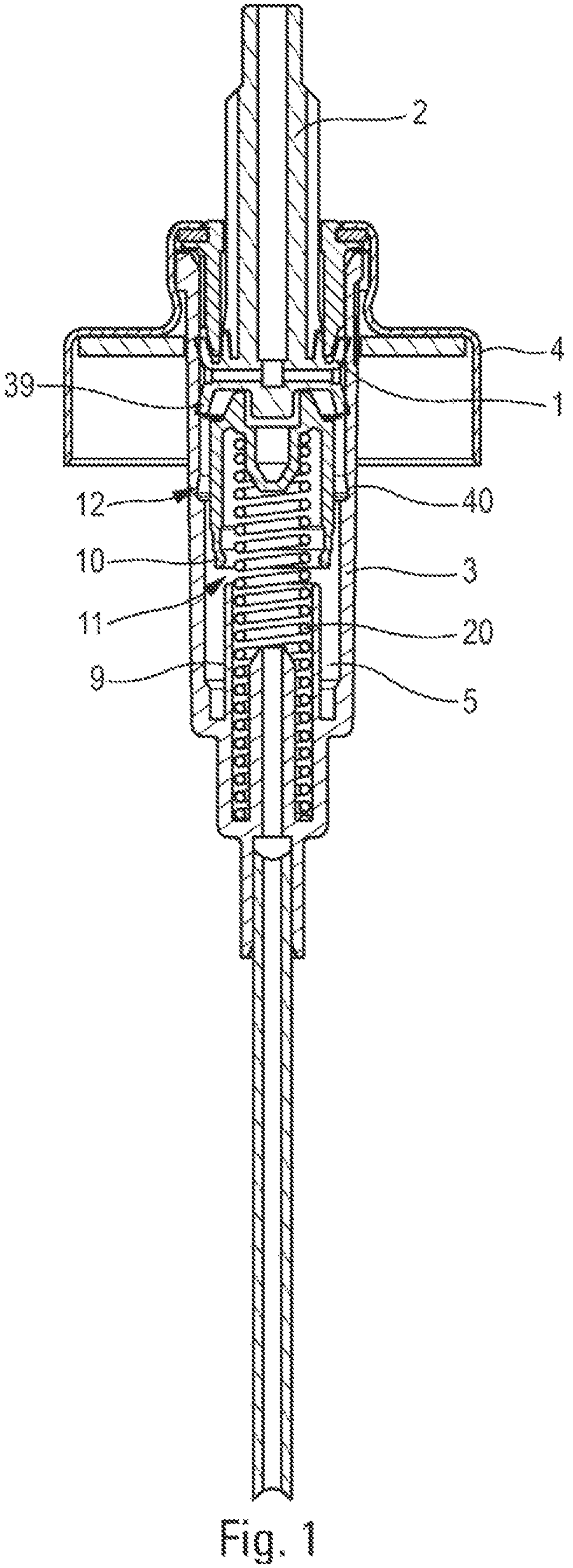

(51) Int. Cl.
*F04B 39/00* (2006.01)
*F04B 53/14* (2006.01)

(58) Field of Classification Search
USPC .............................................. 29/888, 888.02
See application file for complete search history.

(56) References Cited

U.S. PATENT DOCUMENTS

| | | | | |
|---|---|---|---|---|
| 5,158,211 | A | 10/1992 | Meshberg | |
| 8,292,130 | B2 * | 10/2012 | Lemaner | B05B 11/0044 222/321.2 |
| 9,707,581 | B2 * | 7/2017 | Petit | B05B 11/1073 |
| 2003/0155378 | A1 * | 8/2003 | Petit | B05B 11/1018 222/321.7 |

FOREIGN PATENT DOCUMENTS

| | | | |
|---|---|---|---|
| EP | 1 878 507 | A2 | 1/2008 |
| FR | 2 820 410 | A1 | 8/2002 |
| KR | 20-0171410 | Y1 | 3/2000 |
| WO | 87/04373 | A1 | 7/1987 |
| WO | 01/02100 | A1 | 1/2001 |
| WO | 2014/125216 | A1 | 8/2014 |
| WO | 2015/194962 | A9 | 12/2015 |
| WO | 2018/100321 | A1 | 6/2018 |
| WO | 2018/219798 | A1 | 12/2018 |

OTHER PUBLICATIONS

International Search Report for PCT/FR2020/050765, dated Aug. 4, 2020.

* cited by examiner

METHOD FOR ASSEMBLING A HIGH-PRESSURE PRECOMPRESSION PUMP

CROSS REFERENCE TO RELATED APPLICATIONS

This application is a National Stage of International Application No. PCT/FR2020/050765 filed May 11, 2020, claiming priority based on French Patent Application No. 1905014 filed May 14, 2019.

The present invention relates to a fluid product dispensing device comprising a spray nozzle provided with several dispensing orifices and a pump to dispense measured quantities of fluid product. More specifically, the pump is a precompression pump, wherein the dispensing of the fluid product is carried out at a high pressure of at least 15 bars. The present invention also relates to the method for assembling such a pump.

Fluid product dispensing devices comprising dispensing nozzles provided with a plurality of dispensing orifices or holes are known, in particular from documents EP1878507 and WO2018/100321. In these documents, the diameter of the holes is generally comprised between 8 and 20 µm. In document EP1878507, the nozzle is associated with a precompression pump delivering the fluid product to the nozzle at a pressure of less than 7 bars. In document WO2018/100321, the nozzle is associated either with a pump, the pressure of which is comprised between 2 and 7 bars, or with a pressurized valve operating with a propellant gas, the pressure of which is comprised between 6 and 13 bars. According to the configuration of the nozzle, in particular for holes with a diameter of less than 5 µm, these pressures can turn out to be insufficient for ensuring an optimal operation of the device. Moreover, it can be desirable to use a precompression pump in order to avoid the propellant gases from the valves, potentially harmful for the user and/or the environment. Documents EP1698399, WO2015/194962 and WO2018/219798 describe other examples of nozzles with microholes.

Documents WO2014/125216, WO0102100, WO8704373 and EP0265270 disclose pumps wherein the dispensing of the fluid product is independent from the speed and/or the actuation force of the user. During actuation of the pump, a spring is compressed under the effect of pressure created inside the pump chamber, said spring being released at the end of actuation after opening of an outlet valve, such that the dose of product contained in the pump chamber is expelled by said spring, independently from the actuation speed of the user. Typically, these pumps deliver a pressure of about 6-7 bars.

An object of the present invention is to provide a device and a pump which do not have the above-mentioned drawbacks.

In particular, an object of the present invention is to provide a fluid product dispensing device, allowing to associate a precompression pump that is actuated manually delivering a high pressure with a dispensing nozzle provided with several dispensing orifices.

An object of the present invention is to provide a pump which delivers the fluid product at a greater pressure compared with traditional pumps.

Another object of the present invention is to provide such a pump which is simple and easy to manufacture and to assemble, and that is reliable in its use.

Another object of the present invention is to provide such a pump that guarantees complete and reproducible dispensing of the contents of the pump chamber on each actuation, regardless of the actuation speed imparted by the user.

Another object of the present invention is to provide a method for assembling such a pump which allows to improve the reliability of the pump during storage and in use, while improving, in particular, the integrity of the parts subjected to a high pressure during actuation.

The present invention thus provides a method for assembling a fluid product dispensing pump, comprising the following steps:

- providing a piston secured to an actuation rod;
- providing a pump body having a pump chamber;
- providing a sleeve, advantageously secured to a fixing ring;
- providing an outlet valve element which slides during actuation in a sealed manner in the pump chamber;
- providing an inlet valve element which slides in a sleeve of the pump body, said sleeve having a reduced diameter;
- providing a spring;
- said method comprising the following steps:
- fixing said outlet valve element in said piston;
- inserting said piston and said outlet valve element into said sleeve, said insertion being carried out from the bottom, in the direction of flow of the fluid during its expulsion;
- inserting said spring and said inlet valve element into said sleeve of reduced diameter, said insertion being carried out from the top, in the direction opposite to the flow of the fluid during its expulsion, so as to wedge said spring between the bottom of said sleeve and said inlet valve element;
- inserting said sleeve into said pump body, said insertion being carried out from the top, in the direction opposite to the flow of the fluid during its expulsion.

Advantageously, after its insertion, said sleeve is welded to said pump body by a sealed weld, in particular an ultrasound weld.

Advantageously, said sealed weld is carried out between two respective radial flanges of said pump body and of said sleeve.

Advantageously, the sealing lips of said piston, of said outlet valve element and of said inlet valve element are oriented in the direction opposite to their respective insertion direction, such that said sealing lips are not damaged during their assembly.

Advantageously, said step of inserting said spring and said inlet valve element into said sleeve of reduced diameter is carried out before said step of inserting said piston and said outlet valve element into said sleeve.

The present invention also relates to a fluid product dispensing device assembled by a method such as described above.

Figure 2:
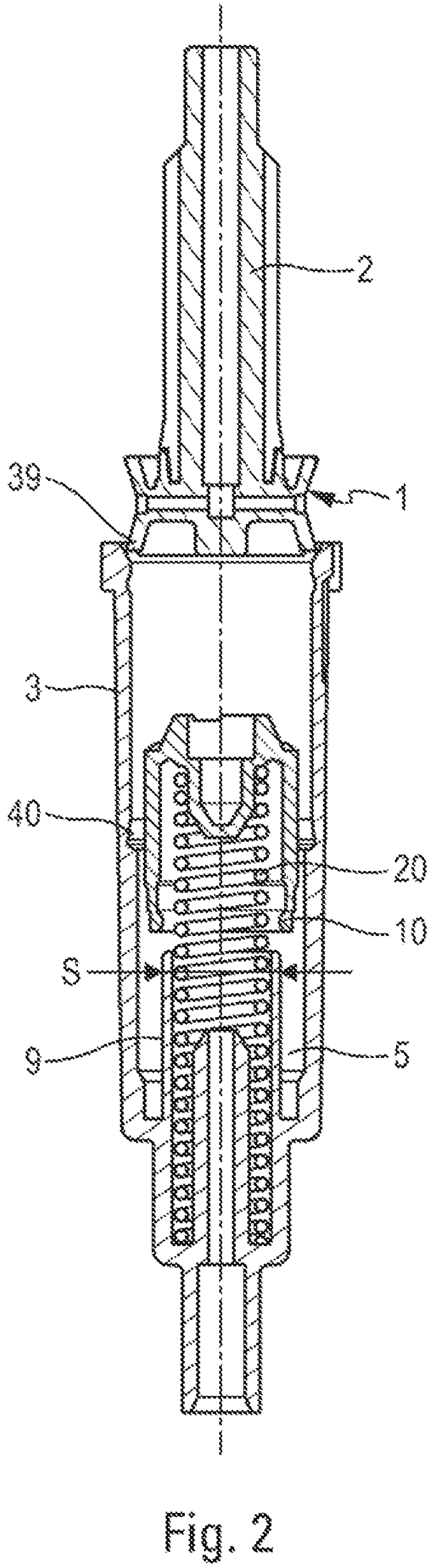
Figure 3:
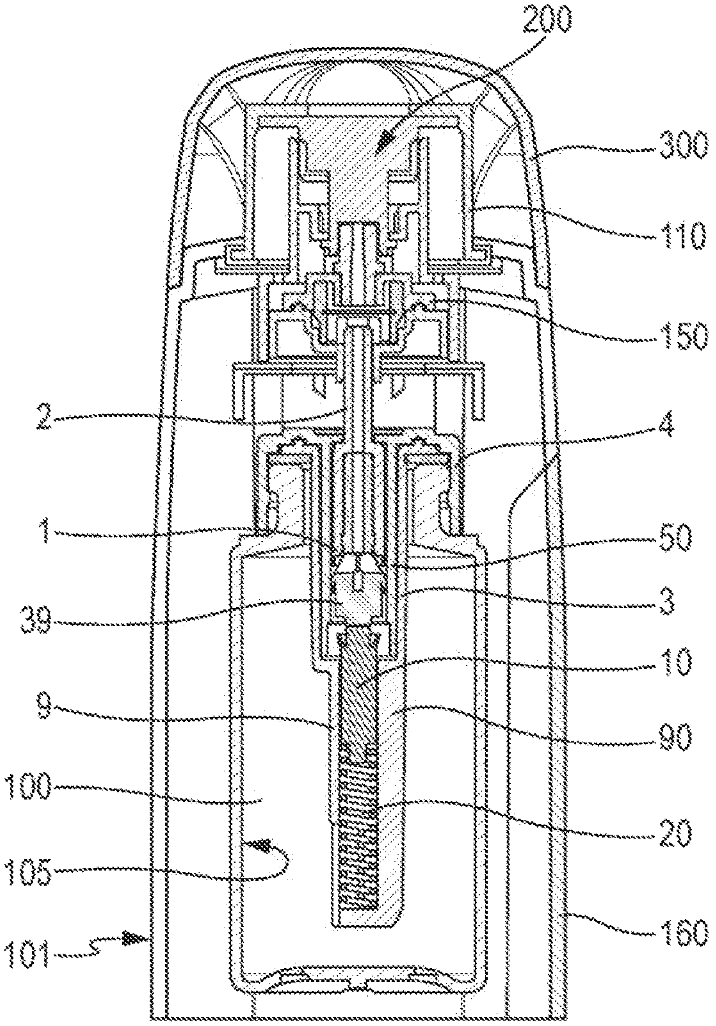
Figure 4:
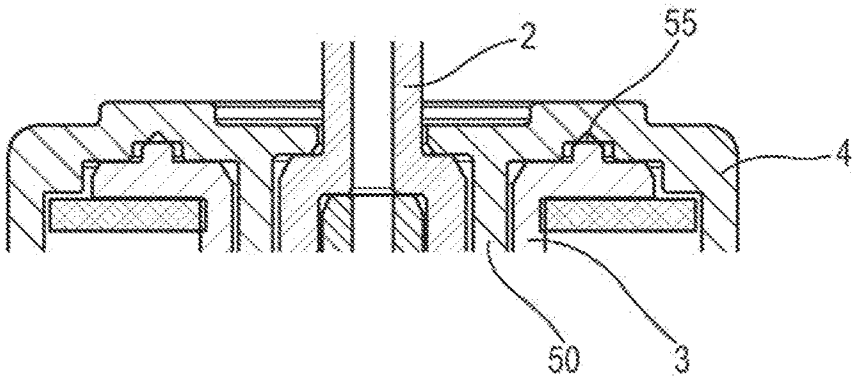
Figure 5:
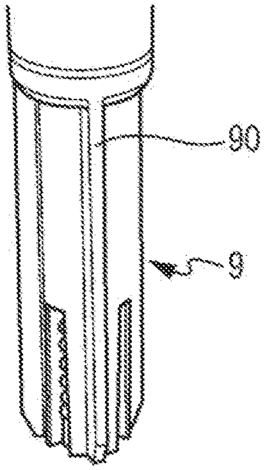
Figure 6:
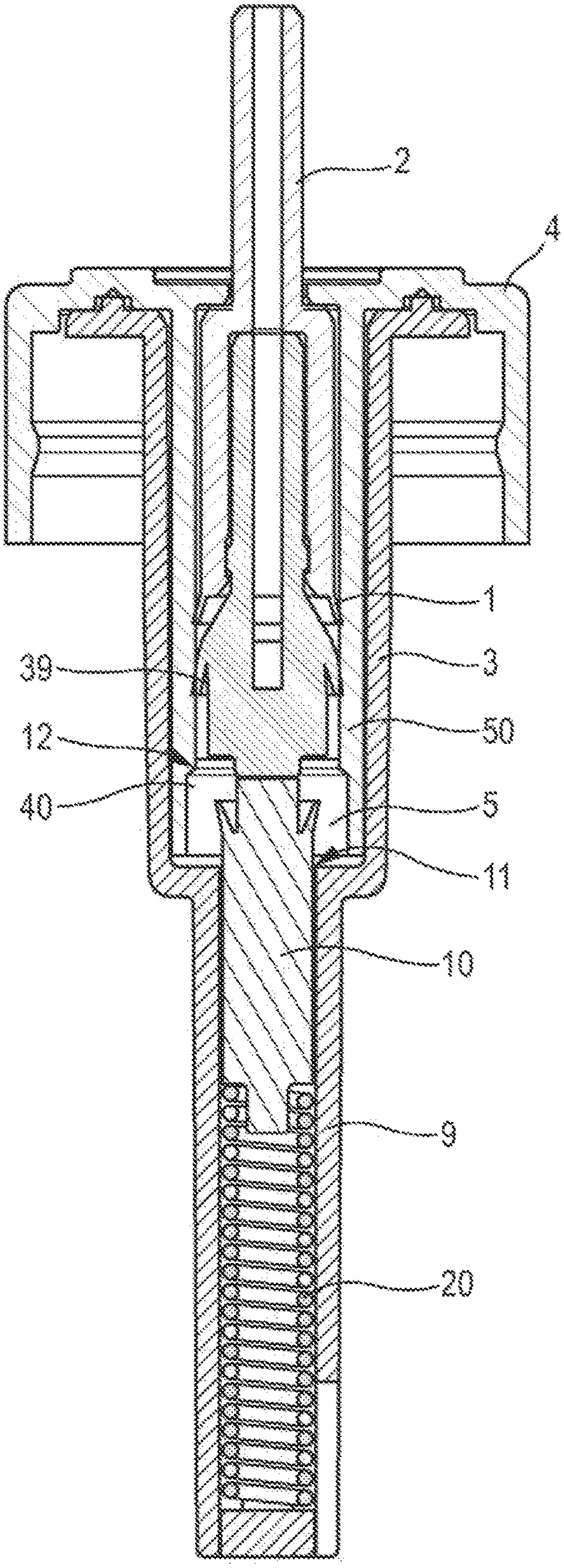
Figure 8:
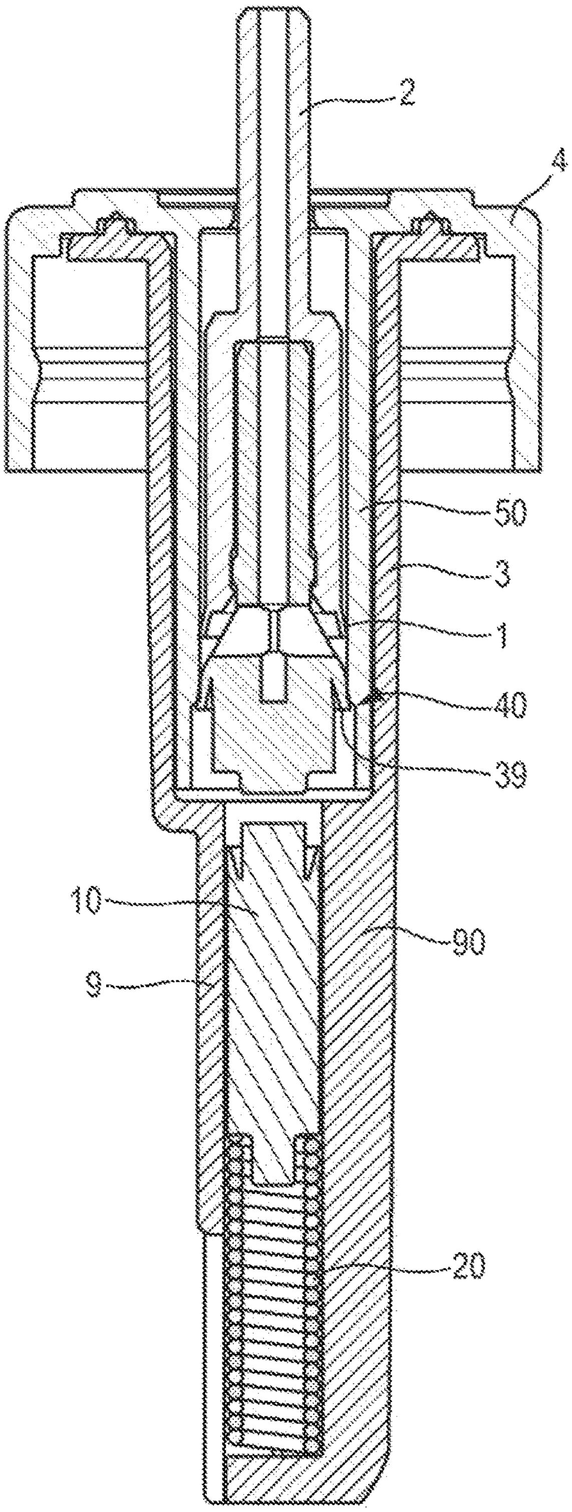
Figure 9:
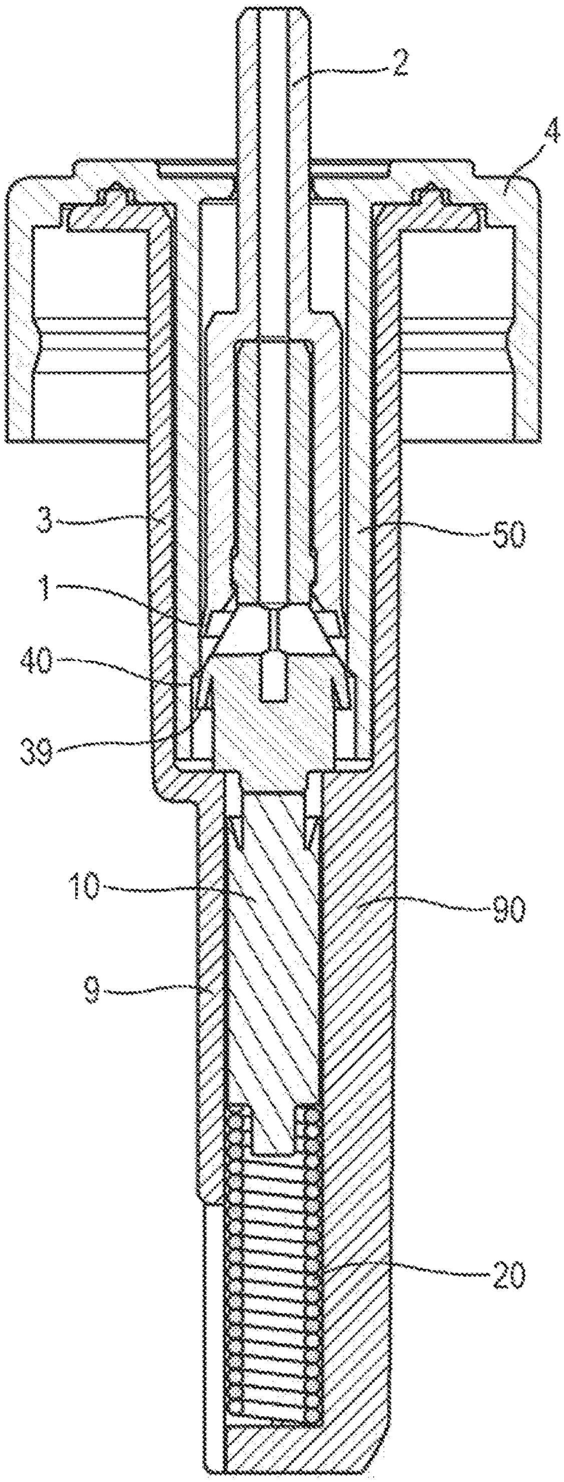
Figure 10:
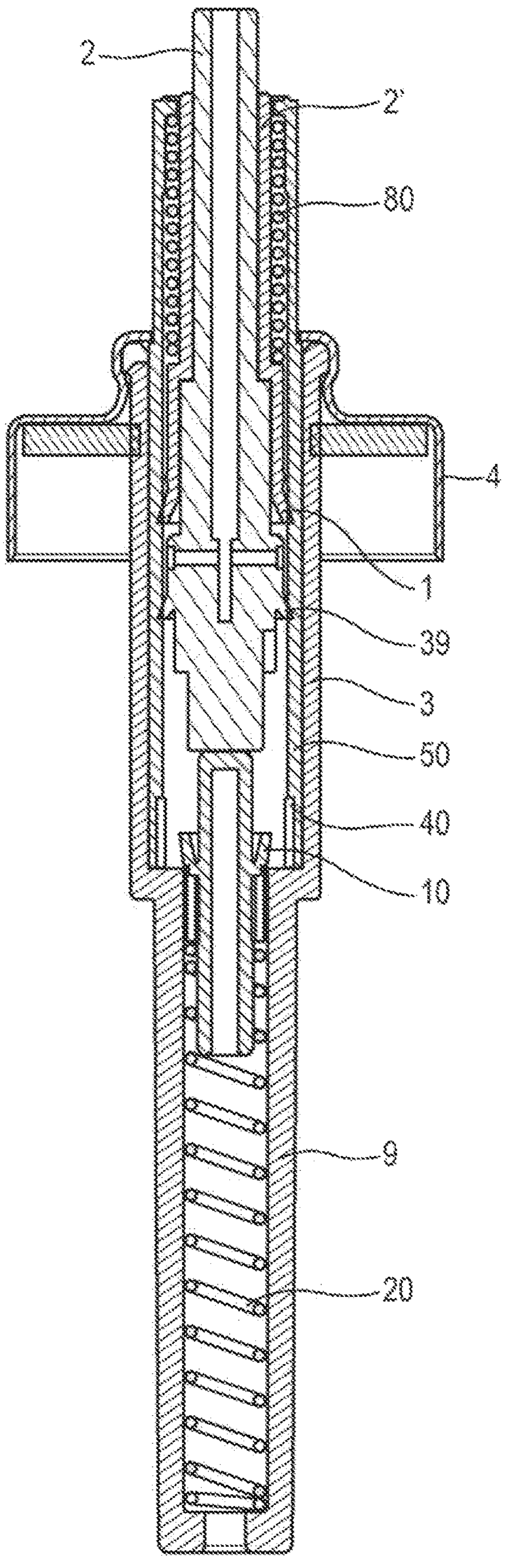
Figure 11:
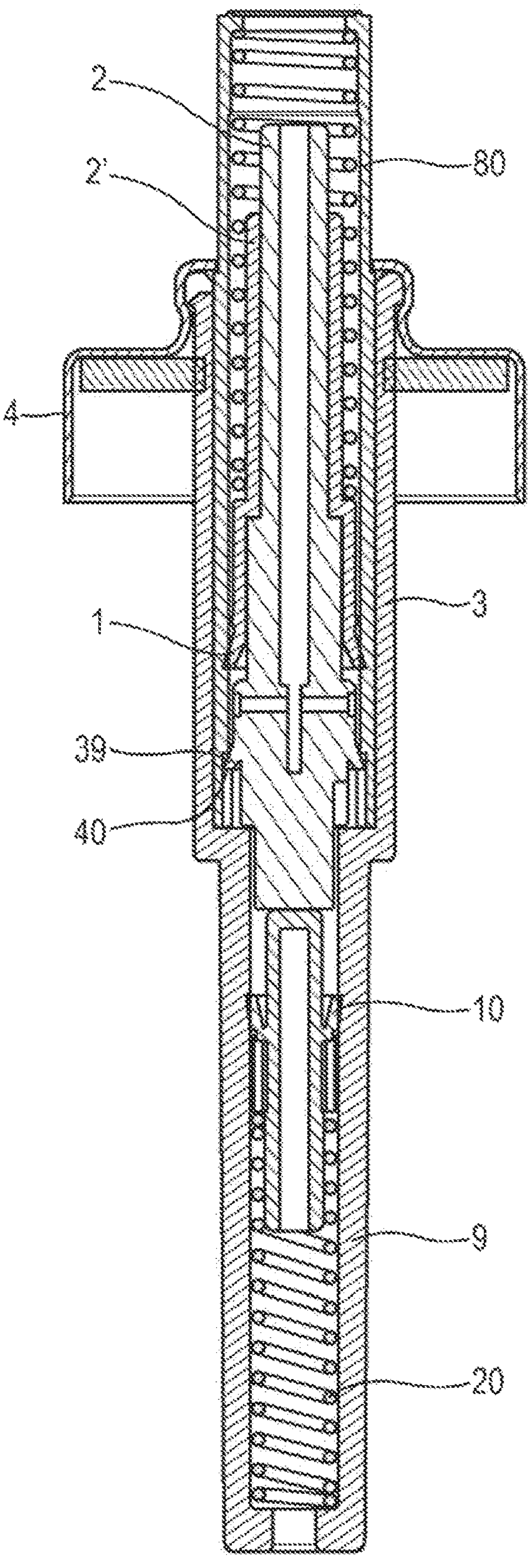
Figure 12:
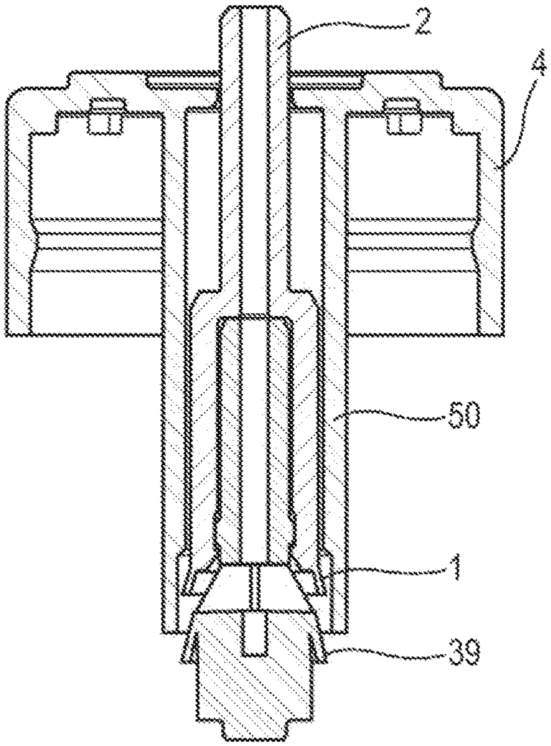
Figure 13:
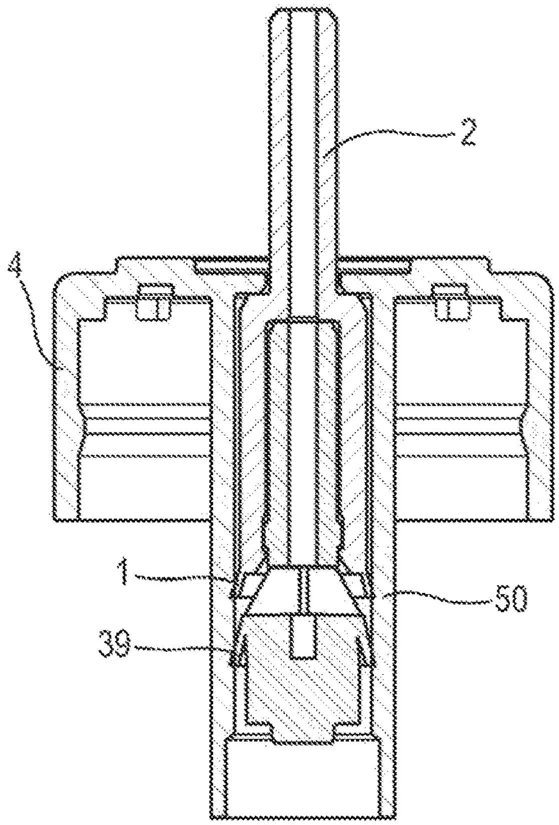
Figure 14:
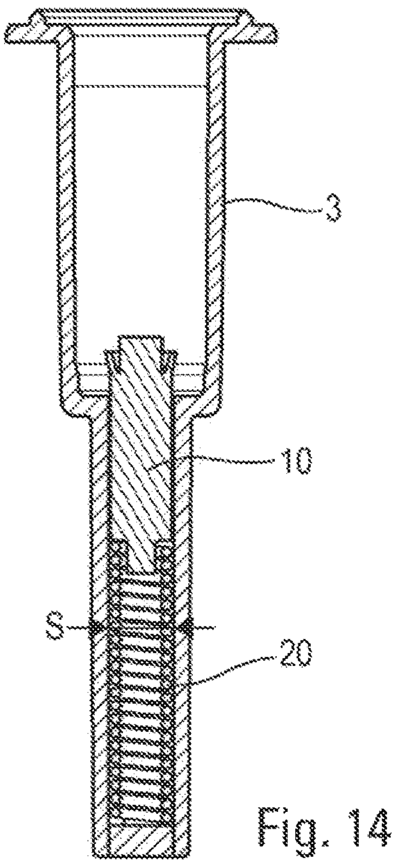

These characteristics and advantages and others of the present invention appear more clearly from the following detailed description, given by way of non-limiting example, and with reference to the accompanying drawings, and in which:

FIG. 1 is a diagrammatic cross-sectional view of a pump of the prior art, in the rest position, FIG. 2 is a fragmentary diagrammatic cross-sectional view of the pump of FIG. 1 during assembly of the top piston, FIG. 3 is a diagrammatic cross-sectional view of a fluid product dispensing device according to one advantageous embodiment, FIG. 4 is a detail enlarged cross-sectional view of a part of the pump represented in FIG. 3, FIG. 5 is a detail enlarged view in perspective of another part of the pump represented in FIG. 3, FIGS. 6 to 9 are diagrammatic cross-sectional views of a pump according to a first advantageous embodiment, respectively in the rest position, at the start of the actuation stroke, during the actuation stroke and at the end of the actuation stroke, FIGS. 10 and 11 are diagrammatic cross-sectional views of a pump according to an advantageous variant embodiment of the present invention, respectively in the rest position and at the end of the actuation stroke, FIGS. 12 and 13 are fragmentary diagrammatic cross-sectional views of the pump of FIG. 6, respectively during and at the end of assembly of the top piston, and FIG. 14 is a fragmentary diagrammatic cross-sectional view of the pump of FIG. 6 during assembly of the bottom piston.

Different aspects of the present invention will be described in reference to several variant embodiments. However, the present invention is naturally not limited by the embodiments shown in the drawings.

FIGS. 1 and 2 show a pump of the prior art, according to document WO2014/125216.

With reference to FIGS. 1 and 2, this pump of the prior art comprises a pump body 3 wherein slides a piston 1 secured to an actuation rod 2 on which the user presses to actuate the pump. The piston 1 slides in a pump chamber 5 defined in the pump body 3 between an inlet valve 11 and an outlet valve 12. A fixing ring 4, which can, for example, be crimped, screwed or snap-fitted, allows to fix the pump to a reservoir.

The inlet valve 11, open in the rest position of the pump, as can be seen in FIG. 1, is formed by an inlet valve element 10 which can be moved in the pump body 3 during actuation of the pump and adapted to co-operate with a part of the pump body 3 at the start of actuation of the pump to close said inlet valve 11. Said inlet valve element 10 is made in the form of a hollow cylinder closed on one side by a bottom wall, the edge of the open end of said hollow cylinder co-operating in a sealed manner from the start of actuation of the pump with a cylinder 9 of the pump body 3 to close the inlet valve 11. A spring 20 is pressed on the one hand on a bottom wall of the inlet valve element 10 and on the other hand, on a part of the pump body 3.

The outlet valve 12 comprises an outlet valve element 39, advantageously formed by the lower lip of the piston 1, and is made such that, during actuation of the pump, is only open at the end of actuation of the pump to allow the expulsion of the product contained in the pump chamber. This opening is made, at passage means formed at a radial inner shoulder 40 of the pump body. The aim of said passage means 40 is to close at least one fluid passage when the outlet valve element 39, which during the whole actuation stroke of the pump co-operates in a sealed manner with the pump body 3, comes to the end of the actuation stroke at said passage means 40.

The expulsion of the product contained in the pump chamber 5 is carried out independently from the actuation speed exerted by the user. To do this, the inlet valve element 10 co-operates with the spring 20 which, during actuation of the pump, is compressed by the movement of the inlet valve element 10 under the effect of pressure created in the pump chamber. At the end of the actuation stroke of the pump, when the outlet valve 12 is open, said compressed spring 20 is suddenly released, such that the product contained in the pump chamber is expelled by means of said spring. Advantageously, said spring 20 of the inlet valve 11 also acts as a return spring of the pump, thus returning the piston 1 into its rest position after the product has been expelled.

The pump of FIGS. 1 and 2 therefore comprises two pistons, on the one hand the piston 1, a part of which defines the outlet valve, and on the other hand the inlet valve element 10 defining the inlet valve and which, during actuation, acts as a piston against the outer surface of the cylinder 9 of the pump body 3.

In FIG. 2, it is seen that during assembly, the two pistons are assembled in the body from the top. Thus, the lower lip 39 of the piston 1, which forms the outlet valve element, abuts against the inlet of the pump body 3, which may weaken this lip. With the lip 39 being oriented axially downwards in the position of FIG. 2, it is necessarily the radially outer end part which produces the sealing which comes into contact with the pump body during assembly. According to the force with which this part is assembled in the pump body, its integrity can be altered, which risks decreasing its sealing capacities, in particular at high pressures.

Likewise, the inlet valve element 10 is also assembled around the sleeve 9 with its sealing lip which hits the upper edge of said sleeve. Once again, there is a risk of damaging the sealing surface of this lip, and therefore altering the sealing performance of said inlet valve element.

This pump of the prior art represented in FIGS. 1 and 2 typically delivers a pressure of about 7 bars. This pressure P is equal to the force F of the spring divided by the surface S on which it is applied, according to the formula P=F/S. In the example of the pump of FIGS. 1 and 2, the spring 20 typically has a force F of 13N, and the surface S, which corresponds to the outer diameter of the sleeve 9 around which the valve element 10 will slide during actuation, is typically 18.8 $mm^2$ (the outer diameter of the sleeve 9 being typically 4.9 mm). The pressure P is therefore about 7 bars. By modifying the spring 20, for example by using a spring with a force of 25N, a pressure of about 13 bars could be reached. However, this cannot really be considered for several reasons. On the one hand, due to its dimensions, the actuation of such a spring of 25N in the pump of FIG. 1 could become difficult, in particular for elderly or frail users. On the other hand, such an increase in pressure would risk not being supported by the two pistons, the sealing lips of which are likely to be damaged during the assembly of the pump (see above). The risks of leakages and malfunction would be too high, preventing a reliable dispensing of complete doses of fluid product on each actuation.

In particular, the present invention provides a precompression pump adapted to deliver a pressure of at least 15 bars, advantageously of at least 20 bars.

To do this, the pump of the prior art of FIGS. 1 and 2 is modified both structurally and operationally, as will be described below. Identical or similar parts are identified in FIGS. 3 to 14 by the same numerical references.

As in the pump of FIGS. 1 and 2, the pump according to the invention comprises a pump body 3 wherein slides a piston 1 secured to an actuation rod 2 on which the user presses to actuate the pump. The piston 1 slides in the pump chamber 5 defined in the pump body 3 between an inlet valve 11 and an outlet valve 12. A fixing ring 4, for example which can be crimped, screwed or snap-fitted, allows to fix the pump to a reservoir.

The side wall of the pump chamber 5 is reinforced by the insertion of a sleeve 50 into the pump body 3. This sleeve 50 can be secured, for example of one part, to the fixing ring 4. This sleeve 50 thus forms a double wall in the pump chamber 5, which allows to avoid a deformation of the inner side wall of the pump chamber 5 due to the high pressure created by the pump during actuation. This sleeve 50 comprises the radial shoulder which defines the outlet valve 40. Advantageously, as can be seen in FIG. 4, to a void any leakages between the sleeve 50 and the pump body 3, a sealed weld 55 is provided, for example by ultrasound, preferably between two radial flanges respectively of said pump body 3 and of said fixing ring 4 which incorporates the sleeve 50.

Likewise, the sleeve 9, which co-operates with the inlet valve element 10, axially extends the pump body 3 downwards in the orientation of FIGS. 6 to 14 and contains said inlet valve element 10 and said spring 20. The inlet valve element 10 is solid and comprises peripheral sealing lips which extend radially outwards. In the rest position, as can be seen in particular in FIG. 6, these sealing lips do not co-operate in a sealed manner with the sleeve 9, such that the inlet valve 11 is open. During actuation, the valve element 10 will slide axially in the sleeve 9 by compressing the spring 20. This sliding is carried out in a sealed manner, the sealing lips of the valve element 10 co-operating in a sealed manner with the sleeve 9.

The sleeve 9 has a reduced diameter with respect to the pump body 3. It advantageously comprises outer reinforcement ridges 90, which can be seen in particular in FIGS. 5 and 7 to 9. This implementation of the sleeve 9 allows to decrease its radial dimensions, with typically an inner diameter less than the outer diameter of the sleeve 9 of the pump of FIG. 1. Thus, for example, the sleeve 9 of the pump of FIG. 6 could have a diameter less than 4.2 mm, advantageously less than 4 mm, preferably 3.9 mm.

The piston 1 and the outlet valve element 39 could be made from one single one-piece part, but preferably, as represented in FIGS. 3 and 6 to 14, the outlet valve element 39 is formed by a separate part which is fixed in the piston 1. This fixing can be done by force-fitting, snap-fitting, screwing, or any other suitable fixing. The sealing lips of the piston 1 and of the outlet valve element 39 are oriented in the same direction, downwards in the position of FIG. 6.

One of the characteristics of the pump according to the invention is the assembly of the piston 1 and of the outlet valve element 39 in the sleeve 50. Contrary to the pump of FIGS. 1 and 2, this assembly is done from the bottom, as can be seen in FIGS. 12 and 13. Thus, the sealing lips are not weakened by this assembly, said lips being oriented in the direction opposite to the direction of assembly. In this way, the elastic deformation of the sealing lips is not achieved by front contact of the radially outer surface of the lips against the sleeve 50 of the pump chamber 5, but on the contrary, the lips are progressively radially deformed inwards, such that the sealing surfaces undergo no sudden stress which would risk altering their sealing capacity.

The inlet valve element 10 comprises sealing lips oriented in the direction opposite to the sealing lips of the piston 1 and to the outlet valve element 39. As can be seen in FIG. 14, said inlet valve element 10 is assembled in the sleeve 9 of the pump body from the top. In this way, its sealing lips are not damaged either during assembly.

The pump according to the invention therefore substantially improves the sealing capacities of the different sealed parts, namely the piston 1, the outlet valve element 39 and the inlet valve element 10.

Thus, it becomes possible to use a spring having a greater force, typically at least 20N, advantageously 25N.

With an inner diameter of the sleeve 9 of 3.9 mm, that is a surface area of 12 $mm^2$, and a spring of 20N, a pressure P of about 16.5 bars is reached. With a spring of 25N, the pressure increases to about 21 bars.

Thus, the present invention allows to provide a precompression pump of the standard type, but capable of dispensing the fluid product at a pressure of at least 15 bars, advantageously about 20 bars, which is greater than traditional standard pumps and even greater than valves operating with a propellant gas.

The actuation force of such a pump with a spring at 25N and the surface area S of 12 $mm^2$ is less than 60N, advantageously of about 50N, which remains acceptable.

The present invention also provides an advantageous assembly method. This assembly method comprises the following steps:

- providing the piston 1 secured to the actuation rod 2;
- providing the pump body 3 having the pump chamber 5;
- providing the sleeve 50, advantageously secured to the fixing ring 4;
- providing the outlet valve element 39 which slides during actuation in a sealed manner in the pump chamber 5;
- providing the inlet valve element 10 which slides in the sleeve 9 of the pump body 3, said sleeve 9 having a reduced diameter;
- providing the spring 20.

The method further comprises the following steps:

- fixing the outlet valve element 39 in the piston 1;
- inserting the piston 1 and the outlet valve element 39 into the sleeve 50, said insertion being carried out from the bottom, in the direction of flow of the fluid during its expulsion;
- inserting the spring 20 and the inlet valve element 10 into the sleeve 9 of reduced diameter, said insertion being carried out from the top, in the direction opposite to the flow of the fluid during its expulsion, so as to wedge the spring 20 between the bottom of the sleeve 9 and the inlet valve element 10;
- inserting the sleeve 50 into the pump body 3, said insertion being carried out from the top, in the direction opposite to the flow of the fluid during its expulsion.

Optionally, the step of inserting the spring 20 and the inlet valve element 10 into the sleeve 9 of reduced diameter can be carried out before the step of inserting the piston 1 and the outlet valve element 39 into the sleeve 50.

The operation of the pump is shown in FIGS. 6 to 9.

The rest position can be seen in FIG. 6, with the inlet valve 11 open and the outlet valve 12 closed.

Figure 7:
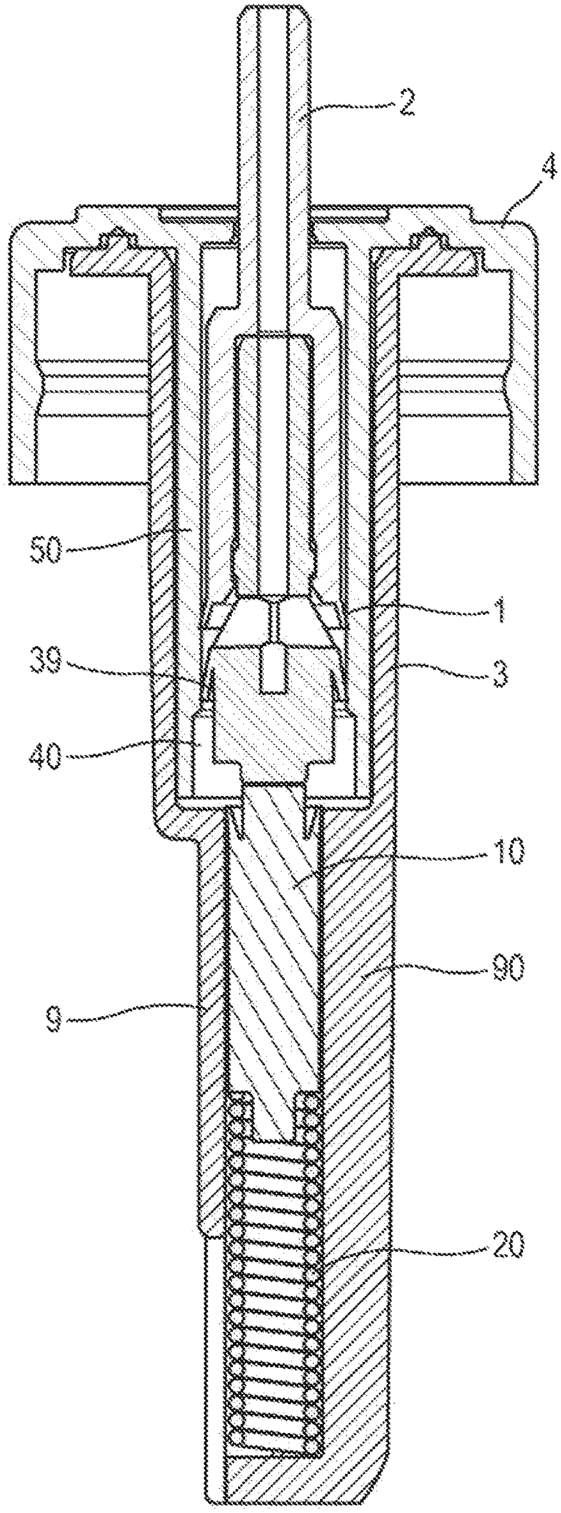

At the start of actuation, which can be seen in FIG. 7, the inlet valve 11 is closed, by sealed co-operation between the lips of the inlet valve element 10 and the inner cylindrical surface of the sleeve 9, while the outlet valve 12 remains closed. The spring 20 is compressed under the effect of the inlet valve element 10 which slides in the sleeve 9. The sleeve 9 having a reduced diameter with respect to the sleeve 50 arranged in the pump body 3, and the fluid contained in the pump chamber 5 being incompressible, this compression of the spring 20 occurs relatively easily, despite the increased force of said spring 20.

When the end of actuation approaches, as can be seen in FIG. 8, the outlet valve element 39 approaches the shoulder 40 of the outlet valve, to open it.

FIG. 9 shows the actuated position, with the outlet valve open and therefore the content of the pump chamber 5 which is expelled under the effect of the spring 20 which decompresses. The fluid product is thus expelled with a pressure of at least 15 bars, advantageously of at least 20 bars.

FIGS. 10 and 11 show a variant embodiment, wherein a second spring 80 is provided to assist the user in their actuation force, in order to reduce this. In this variant, the second spring 80 is advantageously arranged around the piston 1 to urge it towards its actuated position. The second spring 80 therefore acts against the spring 20, and consequently its force must be less than that of the spring 20.

With such a second spring 80, it could be considered to use a spring 20 which is even more powerful, for example of force F greater than 30N, advantageously even greater than 35N, for example 38N, which, for a surface area S of 12 $mm^2$, would allow to reach pressures P greater than 25 bars, advantageously greater than 30 bars, for example 32 bars.

Advantageously, the piston 1 can be secured to an outer sleeve 2' assembled around the actuation rod 2, itself secured to the outlet valve element 39. This implementation could also be adapted to the variant of FIGS. 6 to 9.

The present invention also relates to a fluid product dispensing device comprising a pump such as described above, associated with a spray nozzle comprising a plurality of dispensing orifices.

The use of a microhole nozzle, as for example that described in document WO2018/100321, can according to the design of the nozzle, and in particular if the microholes have a diameter of less than 5 μm, even less than 2 μm, require a fluid arriving with a high pressure, typically greater than 15 bars. The present invention allows to guarantee a pressure of at least 15 bars, advantageously of at least 20 bars, and this without using propellant gas.

As can be seen in FIG. 3, the device comprises a body 101 containing a reservoir 100, on which is mounted a pump such as described above, by means of the fixing ring 4.

The reservoir 100 is preferably without an air intake. Advantageously, a deformable pouch 105 is fixed inside said reservoir 100, said pouch containing the fluid product and being deformed as doses are dispensed. Preferably, the filling of the pouch can be carried out under vacuum. This implementation guarantees the delivery of almost all of the product contained in the pouch, it allows an actuation of the device in any orientation, and it avoids any risk of contamination of the fluid product contained in the pouch. In a variant to the pouch, a follower piston could also be used in the reservoir 100.

Possibly, a device operating with an air intake could also be used, in which case a filter would be advantageously provided for filtering the vent air.

A microhole nozzle 200, the operation of which will not be described in more detail below, but which can be of any known types, such as described, for example, in documents EP1878507, WO2018/100321, EP1698399, WO2015/194962 or WO2018/219798, is arranged in a dispensing endpiece 110 fixed to the body 101. This dispensing endpiece 110 can be, for example, a mouthpiece. Typically, the fluid expelled by the pump hits a plate borne with a plurality of microholes, which generates the spraying of the fluid.

The microholes of the nozzle 200 have a diameter of less than 5 μm, preferably less than 2 μm.

Advantageously, a filter 150 is interposed between the outlet of the pump and the nozzle 200. This filter is used to filter the impurities which could be transported by the fluid when it passes through the different plastic parts. Indeed, there is still a risk that particles are generated during manufacturing and assembly methods, with risks of blocking the microholes of the nozzle.

Advantageously, the body 101 comprises a side actuation arm 160, which allows to actuate the pump by a side actuation.

Naturally, the invention is not limited to the embodiments shown in the drawings, and the ambit of the invention is, on the contrary, defined by the accompanying claims.

The invention claimed is:

1. A method for assembling a fluid product dispensing pump, comprising the following steps:
- providing a piston secured to an actuation rod;
- providing a pump body having a pump chamber;
- providing a fixing ring to which a fixing ring sleeve is secured;
- providing an outlet valve element which slides during actuation in a sealed manner in the pump chamber;
- providing an inlet valve element which slides in a pump body sleeve of the pump body, said pump body sleeve having a reduced diameter with respect to said pump chamber;
- providing a spring;
- wherein said method further comprises the following steps:
- fixing said outlet valve element in said piston;
- inserting said piston and said outlet valve element in said fixing ring sleeve, said insertion being carried out from the bottom, in the direction of flow of the fluid during its expulsion;
- inserting said spring and said inlet valve element into said pump body sleeve, said insertion being carried out from the top, in the direction opposite to the flow of the fluid during its expulsion, so as to wedge said spring between the bottom of said pump body sleeve and said inlet valve element;
- inserting said fixing ring sleeve into said pump body, said insertion being carried out from the top, in the direction opposite to the flow of the fluid during its expulsion.

2. The method according to claim 1, wherein after its insertion, said fixing ring sleeve is welded to said pump body by a sealed weld.

3. The method according to claim 2, wherein said sealed weld is carried out between two respective radial flanges of said pump body and said fixing ring sleeve.

4. The method according to claim 1, wherein sealing lips of said piston, of said outlet valve element and of said inlet valve element are oriented in the direction opposite to their respective direction of insertion, such that said sealing lips are not damaged during their assembly.

5. The method according to claim 1, wherein said step of inserting said spring and said inlet valve element into said pump body sleeve is carried out before said step of inserting said piston and said outlet valve element into said fixing ring sleeve.

6. The method according to claim 2, wherein said sealed weld is an ultrasound weld.

* * * * *